(12) United States Patent
Braun

(10) Patent No.: US 10,711,717 B2
(45) Date of Patent: *Jul. 14, 2020

(54) METHOD FOR THE COMBINED IDENTIFICATION OF PHASE DIFFERENCES OF THE INLET VALVE STROKE AND OF THE OUTLET VALVE STROKE

(71) Applicant: CPT Group GmbH, Hannover (DE)

(72) Inventor: Tobias Braun, Undorf (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/338,599

(22) PCT Filed: Aug. 10, 2017

(86) PCT No.: PCT/EP2017/070339
§ 371 (c)(1),
(2) Date: Apr. 1, 2019

(87) PCT Pub. No.: WO2018/068923
PCT Pub. Date: Apr. 19, 2018

(65) Prior Publication Data
US 2020/0040830 A1 Feb. 6, 2020

(30) Foreign Application Priority Data
Oct. 10, 2016 (DE) .......... 10 2016 219 584

(51) Int. Cl.
*F02D 41/00* (2006.01)
*F01L 1/344* (2006.01)
(Continued)

(52) U.S. Cl.
CPC ............ *F02D 41/009* (2013.01); *F01L 1/344* (2013.01); *F02D 13/0219* (2013.01);
(Continued)

(58) Field of Classification Search
CPC . F01L 1/344; F01L 13/0015; F01L 2013/113; F01L 2013/115; F01L 2201/00;
(Continued)

(56) References Cited

U.S. PATENT DOCUMENTS 5,889,205 A    3/1999   Treinies et al. ............ 73/114.32
6,804,997 B1   10/2004   Schwulst ................... 73/114.37
(Continued)

FOREIGN PATENT DOCUMENTS

DE          3506114 A1    9/1986  ............. F02D 41/14
DE   102005007057 A1    8/2006  ............. F02D 41/18
(Continued)

OTHER PUBLICATIONS

German Office Action, Application No. 102016219582.4, 5 pages, dated Jan. 16, 2017.
(Continued)

*Primary Examiner* — Jorge L Leon, Jr.
(74) *Attorney, Agent, or Firm* — Slayden Grubert Beard PLLC

(57) ABSTRACT

Various embodiments include a method for identifying valve stroke phase differences during operation comprising: measuring dynamic pressure oscillations in the air intake tract; generating a corresponding signal; acquiring a crankshaft phase angle; acquiring the phase position and the amplitude of a signal frequency of the oscillations based on the pressure oscillation using discrete Fourier transformation; acquiring a line of an equal phase position and of equal amplitude of the signal frequency reflecting the inlet and the outlet stroke phase difference using reference lines; acquiring a common intersection point of a line of equal phase position and a line of equal amplitude by projection into a common plane; and determining the stroke phase differences and from the common intersection point.

11 Claims, 7 Drawing Sheets

(51) Int. Cl.
*F02D 13/02* (2006.01)
*F02D 41/14* (2006.01)
*F02D 41/24* (2006.01)
*F02D 41/28* (2006.01)

(52) U.S. Cl.
CPC ..... *F02D 41/1401* (2013.01); *F02D 41/2464* (2013.01); *F02D 41/28* (2013.01); *F01L 2001/34496* (2013.01); *F01L 2800/14* (2013.01); *F01L 2820/041* (2013.01); *F01L 2820/042* (2013.01); *F01L 2820/043* (2013.01); *F02D 2041/1433* (2013.01); *F02D 2041/288* (2013.01); *F02D 2200/024* (2013.01); *F02D 2200/0406* (2013.01)

(58) Field of Classification Search
CPC ............... F01L 2800/09; F01L 2800/14; F01L 2800/18; F01L 2820/042; F01L 2820/043; F02D 13/0219; F02D 41/009; F02D 2041/1433; F02D 41/1448; F02D 41/2432; F02D 2041/288; F02D 2200/0406
USPC ...................................................... 123/90.15
See application file for complete search history.

(56) References Cited

U.S. PATENT DOCUMENTS

| | | | |
|---|---|---|---|
| 2009/0312932 A1 | 12/2009 | Wang et al. | 701/102 |
| 2010/0063775 A1 | 3/2010 | Colling | 702/182 |
| 2017/0198649 A1 | 7/2017 | Kainz et al. | |
| 2018/0051598 A1* | 2/2018 | Pedro | B60K 6/48 |

FOREIGN PATENT DOCUMENTS

| | | | | |
|---|---|---|---|---|
| DE | 102008052245 A1 | 4/2010 | ............ | F02D 41/00 |
| DE | 102012212860 B3 | 12/2013 | ............... | F01M 1/00 |
| DE | 102015209665 A1 | 12/2015 | ............. | F02D 41/00 |
| WO | 96/32579 A1 | 10/1996 | ............. | F02D 41/04 |
| WO | 2018/068922 A1 | 4/2018 | ............. | F01L 13/00 |
| WO | 2018/068923 A1 | 4/2018 | ............. | F01L 13/00 |

OTHER PUBLICATIONS

German Office Action, Application No. 102016219584.0, 8 pages, dated May 29, 2017.
International Search Report and Written Opinion, Application No. PCT/EP2017/070339, 13 pages, dated Nov. 21, 2017.
International Search Report and Written Opinion, Application No. PCT/EP2017/070315, 13 pages, dated Nov. 21, 2017.

* cited by examiner

METHOD FOR THE COMBINED IDENTIFICATION OF PHASE DIFFERENCES OF THE INLET VALVE STROKE AND OF THE OUTLET VALVE STROKE

CROSS-REFERENCE TO RELATED APPLICATIONS

This application is a U.S. National Stage Application of International Application No. PCT/EP2017/070339 filed Aug. 10, 2017, which designates the United States of America, and claims priority to DE Application No. 10 2016 219 584.0 filed Oct. 10, 2016, the contents of which are hereby incorporated by reference in their entirety.

TECHNICAL FIELD

The present disclosure relates to internal combustion engines. Various embodiments may include methods for identifying phase differences of the valve stroke of the inlet valves and of the outlet valves of a reciprocating-piston internal combustion engine during operation.

BACKGROUND

Reciprocating-piston internal combustion engines, which will hereinafter also be referred to in shortened form merely as internal combustion engines, have one or more cylinders in which in each case one reciprocating piston is arranged. To illustrate the principle of a reciprocating-piston internal combustion engine, reference will be made below to FIG. 1, which illustrates by way of example a cylinder of an internal combustion engine, which is possibly also a multi-cylinder internal combustion engine, together with the most important functional units.

The respective reciprocating piston 6 is arranged in linearly movable fashion in the respective cylinder 2 and, together with the cylinder 2, encloses a combustion chamber 3. The respective reciprocating piston 6 is connected by means of a so-called connecting rod 7 to a respective crankpin 8 of a crankshaft 9, wherein the crankpin 8 is arranged eccentrically with respect to the crankshaft axis of rotation 9a. As a result of the combustion of a fuel-air mixture in the combustion chamber 3, the reciprocating piston 6 is driven linearly "downward". The translational stroke movement of the reciprocating piston 6 is transferred by means of the connecting rod 7 and crankpin 8 to the crankshaft 9 and is converted into a rotational movement of the crankshaft 9, which causes the reciprocating piston 6, after it passes through a bottom dead center in the cylinder 2, to be moved "upward" again in the opposite direction as far as a top dead center. To permit continuous operation of the internal combustion engine 1, during a so-called working cycle of a cylinder 2, it is necessary firstly for the combustion chamber 3 to be filled with the fuel-air mixture, for the fuel-air mixture to be compressed in the combustion chamber 3 and to then be ignited and burned in an expanding fashion in order to drive the reciprocating piston 6, and finally for the exhaust gas that remains after the combustion to be discharged from the combustion chamber 3. Continuous repetition of this sequence results in continuous operation of the internal combustion engine 1, with work being output in a manner proportional to the combustion energy.

Depending on the engine concept, a working cycle of the cylinder 2 is divided into two strokes distributed over one crankshaft rotation)(360°) (two-stroke engine) or into four strokes distributed over two crankshaft rotations)(720°) (four-stroke engine). To date, the four-stroke engine has become established as a drive for motor vehicles. In an intake stroke, with a downward movement of the reciprocating piston 6, fuel-air mixture or else only fresh air (in the case of fuel direct injection) is introduced from the air intake tract 20 into the combustion chamber 3. During the following compression stroke, with an upward movement of the reciprocating piston 6, the fuel-air mixture or the fresh air is compressed in the combustion chamber 3, and if appropriate fuel is separately injected by means of an injection valve 5, which belongs to a fuel supply system, directly into the combustion chamber 3. During the following working stroke, the fuel-air mixture is ignited by means of an ignition plug 4, burned with an expanding action and expanded, outputting work, with a downward movement of the reciprocating piston 6. Finally, in an exhaust stroke, with another upward movement of the reciprocating piston 6, the remaining exhaust gas is discharged out of the combustion chamber 3 into the exhaust-gas outlet tract 30.

The delimitation of the combustion chamber 3 with respect to the air intake tract 20 or exhaust-gas outlet tract 30 of the internal combustion engine is realized generally, and in particular in the example taken as a basis here, by means of inlet valves 22 and outlet valves 32. In the current prior art, said valves are actuated by means of at least one camshaft. The example shown has an inlet camshaft 23 for actuating the inlet valves 22 and has an outlet camshaft 33 for actuating the outlet valves 32. There are normally yet further mechanical components (not illustrated here) for force transmission provided between the valves and the respective camshaft, which components may also include a valve play compensation means (e.g. bucket tappet, rocker lever, finger-type rocker, tappet rod, hydraulic tappet etc.).

The inlet camshaft 23 and the outlet camshaft 33 are driven by means of the internal combustion engine 1 itself. For this purpose, the inlet camshaft 23 and the outlet camshaft 33 are coupled in each case by means of suitable inlet camshaft control adapters 24 and outlet camshaft control adapters 34, such as for example toothed gears, sprockets or belt pulleys using a control mechanism 40, which has for example a toothed gear mechanism, a control chain or a toothed control belt, in a predefined position with respect to one another and with respect to the crankshaft 9 by means of a corresponding crankshaft control adapter 10, which is correspondingly embodied as a toothed gear, sprocket or belt pulley, to the crankshaft 9. By means of this connection, the rotational position of the inlet camshaft 23 and of the outlet camshaft 33 in relation to the rotational position of the crankshaft 9 is, in principle, defined. By way of example, FIG. 1 illustrates the coupling between inlet camshaft 23 and the outlet camshaft 33 and the crankshaft 9 by means of belt pulleys and a toothed control belt.

The rotational angle covered by the crankshaft during one working cycle will hereinafter be referred to as working phase or simply as phase. A rotational angle covered by the crankshaft within one working phase is accordingly referred to as phase angle. The respectively current crankshaft phase angle of the crankshaft 9 can be detected continuously by means of a position encoder 43 connected to the crankshaft 9, or to the crankshaft control adapter 10, and an associated crankshaft position sensor 41. Here, the position encoder may be formed for example as a toothed gear with a multiplicity of teeth arranged so as to be distributed equidistantly over the circumference, wherein the number of individual teeth determines the resolution of the crankshaft phase angle signal.

It is likewise additionally possible, if appropriate, for the present phase angles of the inlet camshaft 23 and of the outlet camshaft 33 to be detected continuously by means of corresponding position encoders 43 and associated camshaft position sensors 42. Since, owing to the predefined mechanical coupling, the respective crankpin 8, and with the latter the reciprocating piston 6, the inlet camshaft 23, and with the latter the respective inlet valve 22, and the outlet camshaft 33, and with the latter the respective outlet valve 32, move in a predefined relationship with respect to one another and in a manner dependent on the crankshaft rotation, said functional components run through the respective working phase synchronously with respect to the crankshaft. The respective rotational positions and stroke positions of reciprocating piston 6, inlet valves 22 and outlet valves 32 can thus, taking into consideration the respective transmission ratios, be set in relation to the crankshaft phase angle of the crankshaft 9 predefined by the crankshaft position sensor 41. In an ideal internal combustion engine, it is thus possible for every particular crankshaft phase angle to be assigned a particular crankpin angle HZW (FIG. 2), a particular piston stroke, a particular inlet camshaft angle and thus a particular inlet valve stroke and also a particular outlet camshaft angle and thus a particular outlet valve stroke. That is to say, all of the stated components are, or move, in phase with the rotating crankshaft 9.

In modern internal combustion engines 1, it is however possible for additional positioning elements to be provided within the mechanical coupling path between crankshaft 9 and inlet camshaft 23 and the outlet camshaft 33, for example in a manner integrated into the inlet camshaft adapter 24 and the outlet camshaft adapter 34, which positioning elements effect a desired controllable phase shift between the crankshaft 9 and inlet camshaft 23 and the outlet camshaft 33. These are known as so-called phase adjusters in so-called variable valve drives. Also symbolically illustrated is an electronic, programmable engine control unit 50 (CPU), which is equipped with signal inputs for receiving the various sensor signals and with signal and power outputs for actuating corresponding positioning units and actuators for controlling the engine functions.

For optimum operation of the internal combustion engine (with regard to emissions, consumption, power, running smoothness etc.), the fresh-gas charge introduced into the combustion chamber during the intake stroke should be known to the best possible extent in order to enable the further parameters for the combustion, such as for example the fuel quantity which is to be supplied, and which is possibly directly injected, to be coordinated therewith. The so-called charge exchange, that is to say the intake of fresh gas and the discharge of the exhaust gas, is in this case highly dependent on the control timing of the inlet valves 22 and outlet valves 32, that is to say on the profile with respect to time of the respective valve strokes in relation to the profile with respect to time of the piston stroke. In other words, during operation, the charge exchange is dependent on the phase positions of the inlet and outlet valves in relation to the crankshaft phase angle and thus in relation to the phase position of the reciprocating piston.

The prior art for acquiring the fresh-gas charge and for coordinating the control parameters of the internal combustion engine therewith comprises measuring a so-called reference internal combustion engine in all occurring operating states, for example as a function of the rotational speed, the load, if appropriate of the valve control timings predefinable by means of phase adjusters, if appropriate the operating parameters of exhaust-gas turbocharger or supercharger etc., and storing these measurement values or derivatives thereof or model approaches representing the behavior on the engine control unit of a corresponding series-production internal combustion engine. All structurally identical, series-produced internal combustion engines of the same type series are then operated with this reference dataset that is generated.

A deviation, resulting for example from manufacturing tolerances, of the actual relative positions between inlet valves and outlet valves and the crankshaft phase angle or the reciprocating-piston position of a series-production internal combustion engine in relation to the ideal reference positions of the reference internal combustion engine, that is to say a phase difference of the inlet valve stroke, of the outlet valve stroke and if appropriate of the piston stroke in relation to the crankshaft phase angle predefined by the crankshaft position sensor, or the phase position of the crankshaft, has the effect that the fresh-gas charge actually drawn in deviates from the fresh-gas charge determined as a reference, and thus the control parameters based on the reference dataset are not optimum. During the operation of the internal combustion engine, these errors can have adverse effects with regard to emissions, consumption, power, running smoothness etc.

For the illustration of the possible deviations that occur in a series-production internal combustion engine, and for the definition of the nomenclature of said deviations, reference will be made below to FIG. 2, which shows the internal combustion engine from FIG. 1 but in which, for a better overview, the reference designations illustrated in FIG. 1 have been omitted and only the corresponding deviations are designated.

Proceeding from a reference position of the position encoder 43 arranged on the crankshaft control adapter 10, the phase angle of which position encoder is detected by the crankshaft position sensor 41, there are resulting multiple tolerance chains that lead to deviations of the phase positions, hereinafter also referred to as phase differences, of reciprocating pistons 6, inlet valves 22 and outlet valves 32 in relation to the ideal reference phase positions. Here, the piston stroke phase difference $\Delta KH$ results for example from a deviation of the crankpin angle HZW, the so-called crankpin angle difference $\Delta HZW$, in relation to the reference position of the crankshaft position sensor 41 and from different dimensional tolerances (not illustrated) of connecting rod 7 and reciprocating piston 6.

Furthermore, the inlet valve stroke phase difference $\Delta EVH$ results for example from a deviation in the cam position, the so-called inlet camshaft angle difference $\Delta ENW$, together with mechanical tolerances (not illustrated) of the inlet camshaft control adapter 24 and of the control mechanism 40. If a phase adjuster for the inlet camshaft is present, then consideration is possibly also given to an inlet camshaft adjustment angle ENVW or to a deviation thereof from the setpoint. In the same way, the outlet valve stroke phase difference $\Delta AVH$ results for example from a deviation in the cam position, the so-called outlet camshaft angle difference $\Delta ANW$, together with mechanical tolerances (not illustrated) of the outlet camshaft control adapter 24 and of the control mechanism 40. If a phase adjuster for the outlet camshaft is present, then consideration is possibly also given to an outlet camshaft adjustment angle ANVW or to a deviation thereof from the setpoint.

Possible causes of the described deviations may for example be:
manufacturing and/or assembly tolerances of the mechanical components involved, and wear phenomena, such as for example a lengthening of the control chain or of the toothed belt by means of which the crankshaft and the camshafts are coupled, and deformation phenomena, elastic or plastic, resulting from high mechanical load states.

The previous solution to the described problem as per the current prior art lies, in principle, in detecting and quantifying the occurring deviations between reference internal combustion engine and series-production internal combustion engine in order to be able to implement corresponding measures for correction or compensation through adaptation of control parameters. Furthermore, it has hitherto been sought to counteract this problem by minimizing manufacturing and assembly tolerances. Furthermore, for example, the control timings are measured on the respective static series-production internal combustion engine on the basis of valve stroke position, cam contour etc., and the internal combustion engine is correspondingly adjusted during the assembly process.

Furthermore, most presently known systems operate with a reference point system (position feedback). Here, in each case one position mark that can be detected by means of a sensor is placed on the crankshaft and on the inlet camshaft and/or on the outlet camshaft, or also on the respective crankshaft control adapter and on the inlet camshaft control adapter and/or on the outlet camshaft control adapter, or also on a phase adjuster that may be provided, etc. In this way, the relative phase position between the crankshaft and the respective inlet camshaft and/or outlet camshaft can be acquired, and deviations in relation to the desired reference values can be identified. The undesired effects of said deviations can then be counteracted in the control unit by means of an adaptation or correction of corresponding control parameters in a manner dependent on the acquired deviations.

In principle, however, only some of the occurring tolerances can be identified by means of this method. For example, it is thus not possible to identify an angular deviation owing to a position deviation of the respective position marks themselves in relation to the camshafts, or an inlet camshaft angle difference $\Delta$ENW or an outlet camshaft angle difference $\Delta$ANW in relation to the respective reference position. Further methods, such as evaluating the knock sensor signal, evaluating the cylinder pressure signal, are likewise known. For example, U.S. Pat. No. 6,804,997 B1 has disclosed an engine control device for determining the phase position of the crankshaft by monitoring and evaluating pressure fluctuations of the intake air in the air intake tract. The control device is designed so as to determine intake air pressure fluctuations, which indicate an intake air event, and thus a crankshaft phase position related thereto and the corresponding period thereof of the engine cycle. The control device utilizes these items of information to acquire the crankshaft rotational speed and the phase position of the crankshaft in order to control the fuel injection and the ignition characteristics of the engine. The control timings of the inlet valves and outlet valves, that is to say if appropriate the inlet valve stroke phase differences and outlet valve stroke phase differences, are not taken into consideration in this case, and can under some circumstances considerably influence the result.

DE 10 2005 007 057 discloses a closed-loop control method for a throttle flap air stream, which is to be controlled in closed-loop fashion, in the intake tract of an internal combustion engine, wherein pressure pulsations of the intake air in the air intake tract, which are also influenced inter alia by the valve control timings of the internal combustion engine, are taken into consideration in the closed-loop control of the fluid stream. For this purpose, the pressure pulsations are analyzed by means of fast Fourier transformation, and the amplitude information is summarized in a distortion factor which is taken into consideration as an additional input variable for example for a multi-dimensional mathematical closed-loop control model of the throttle flap air stream. Specific conclusions regarding the valve control timings, that is to say also possibly present inlet valve stroke phase differences and outlet valve stroke phase differences, of the internal combustion engine cannot be drawn by means of this method.

DE 35 06 114 A1 discloses a method for the open-loop or closed-loop control of an internal combustion engine in which, in a manner dependent on an operating variable which comprises at least a part of an oscillation spectrum of the internal combustion engine as information, such as for example gas pressure signals, at least one manipulated variable of the internal combustion engine is controlled. For this purpose, the value spectrum contained in the detected operating variable is determined therefrom, as a part of the oscillation spectrum, by discrete Fourier transformation and is used as a measurement spectrum and compared with a reference spectrum. The manipulated variable of the internal combustion engine which is to be controlled is then controlled as a function of the deviation between the measurement spectrum and the reference spectrum. A specific conclusion regarding the valve control timings and piston stroke position of the internal combustion engine cannot be easily drawn by means of this method either.

US 2009 0 312 932 A1 discloses a method for performing diagnostics on the combustion within an internal combustion engine, wherein a combustion phase setting value is generated from the crankshaft angular speed by means of a fast Fourier transformation, said value is compared with an expected combustion phase setting value, and differences between said values greater than an admissible combustion phase setting difference are identified. A similar approach for determining deviations between a reference engine and series-production engine to those described above is also disclosed in US 2010 0 063 775 A1.

SUMMARY

The present disclosure describes various simple and cost-effective methods by means of which particularly accurate identification of the actual phase positions of the inlet valves and of the outlet valves is possible, and/or the inlet valve stroke phase difference $\Delta$EVH and the outlet valve stroke phase difference $\Delta$AVH can be reliably determined during ongoing operation of the internal combustion engine. For example, some embodiments include a method for the combined identification of an inlet valve stroke phase difference and of an outlet valve stroke phase difference of a cylinder of a series-production internal combustion engine during operation, wherein dynamic pressure oscillations, assignable to the cylinder, of the intake air in the air intake tract of the respective series-production internal combustion engine are measured during operation, and a corresponding pressure oscillation signal is generated therefrom, and wherein a crankshaft phase angle signal is acquired at the same time, wherein, from the pressure oscillation signal, the phase position and the amplitude of at least one respectively selected signal frequency of the measured pressure oscillations in relation to the crankshaft phase angle signal are acquired using discrete Fourier transformation, characterized by the following further steps: acquiring, on the basis of the acquired phase position and amplitude of the respective selected signal frequency, in each case a line of an equal phase position and of equal amplitude of the respectively same signal frequency, which line is dependent on the inlet valve stroke phase difference and the outlet valve stroke phase difference, using reference lines of the equal phase position and of the equal amplitude of the respective signal frequency, which reference lines are stored in reference line characteristic diagrams or acquired by means of a respective algebraic model function; acquiring at least one respective common intersection point of an acquired line of an equal phase position and of an acquired line of equal amplitude of the respective signal frequency by projection into a common plane spanned by the inlet valve stroke phase difference and the outlet valve stroke phase difference; and determining the inlet valve stroke phase difference and the outlet valve stroke phase difference from the acquired common intersection point of the line of an equal phase position and of the line of equal amplitude of the respective signal frequency.

In some embodiments, the phase positions and the amplitudes of a plurality of selected signal frequencies are acquired, and in that the respective lines of an equal phase position and of equal amplitude of the selected signal frequencies are acquired on the basis of the acquired phase positions and amplitudes of the respective selected signal frequencies, and in that a plurality of common intersection points of in each case an acquired line of an equal phase position and of an acquired line of equal amplitude of the selected signal frequencies are acquired, and in that the inlet valve stroke phase difference and the outlet valve stroke phase difference are acquired from the plurality of intersection points by forming mean values.

In some embodiments, said method comprises the following preceding steps: measuring a reference internal combustion engine in order to determine reference lines of equal phase positions and of equal amplitudes of selected signal frequencies of the pressure oscillation signal in the air intake tract as a function of the reference inlet valve stroke phase difference and the reference outlet valve stroke phase difference, and storing the reference lines of equal phase positions and of equal amplitudes of the selected signal frequencies of the pressure oscillation signal in each case as a function of the reference inlet valve stroke phase difference and the reference outlet valve stroke phase difference in reference line characteristic diagrams.

In some embodiments, the reference line characteristic diagrams are stored in a memory area of an engine control unit of the respective series-production internal combustion engine.

In some embodiments, algebraic model functions which represent the profile of the respective reference lines of equal phase positions and the profile of the respective reference lines of equal amplitudes of the selected signal frequencies of the pressure oscillation signal are derived from the reference line characteristic diagrams of the selected signal frequencies of the pressure oscillation signal for the respective signal frequency as a function of the reference inlet valve stroke phase difference and the reference outlet valve stroke phase difference.

In some embodiments, the algebraic model functions for the selected signal frequencies are stored in a memory area of an engine control unit of the respective series-production internal combustion engine.

In some embodiments, the lines of equal amplitudes and of equal phase positions are projected into a common plane spanned by the inlet valve stroke phase difference and the outlet valve stroke phase difference, and the common intersection point of these lines is acquired on the basis of algebraic functions.

In some embodiments, the method is executed on an electronic, programmable engine control unit of the respective series-production internal combustion engine.

In some embodiments, adaptation of control variables or control routines in the context of a correction of or adaptation to the acquired inlet valve stroke phase difference and the acquired outlet valve stroke phase difference is carried out on the engine control unit.

In some embodiments, the selected signal frequencies include the intake frequency and further multiples of the intake frequency of the internal combustion engine.

In some embodiments, the dynamic pressure oscillations in the air intake tract are measured using a series-production-type pressure sensor assigned to the air intake tract.

BRIEF DESCRIPTION OF THE DRAWINGS

A detailed consideration of the relationships on which the invention is based will be presented below, with reference to the figures. In the drawings.

Figure 1:
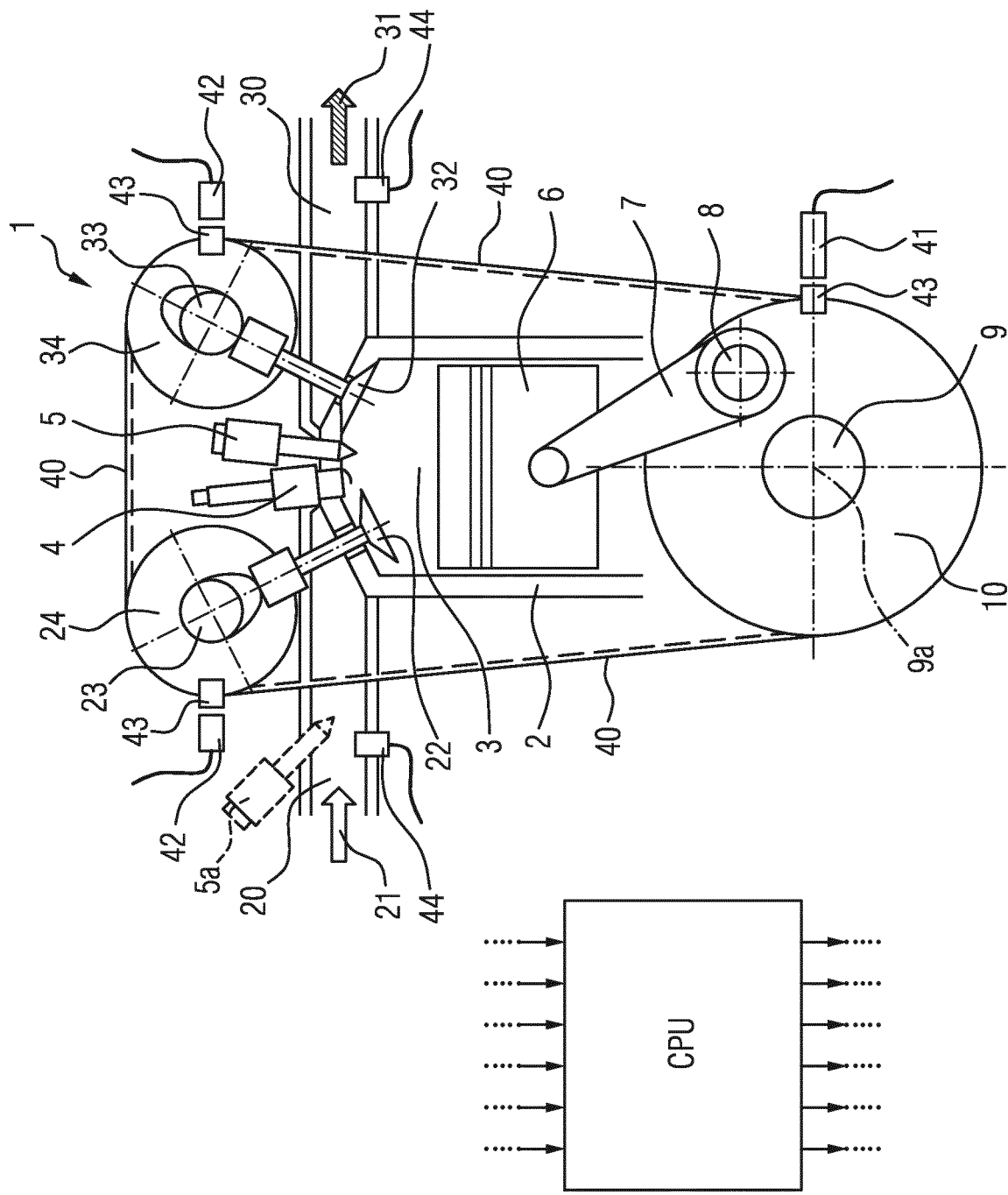
FIG. 1: shows a simplified schematic drawing of a reciprocating-piston internal combustion engine.
Figure 2:
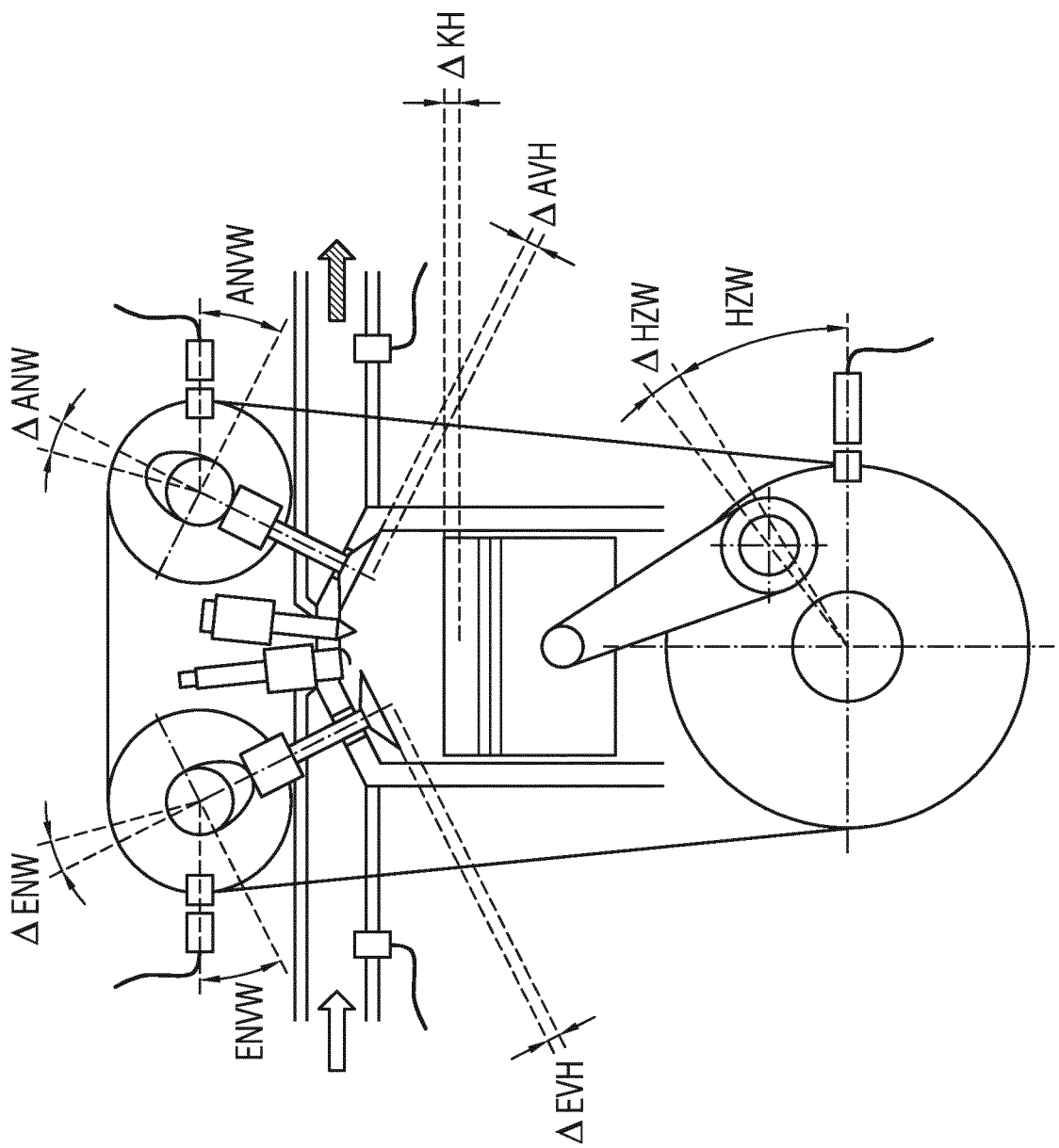
FIG. 2: shows the schematic drawing as per FIG. 1, with labelling of the possible position and angle deviations of significant components of the reciprocating-piston internal combustion engine.

Parts which are identical in terms of function and designation are denoted by the same reference signs throughout the figures.

DETAILED DESCRIPTION

Some embodiments include a method for the combined identification of an inlet valve stroke phase difference and of an outlet valve stroke phase difference of a cylinder of a series-production internal combustion engine during operation, dynamic pressure oscillations, assignable to the respective cylinder, in the air intake tract of the respective series-production internal combustion engine are measured during operation, and a corresponding pressure oscillation signal is generated therefrom. A crankshaft phase angle signal is acquired at the same time. From the pressure oscillation signal, the phase position and the amplitude of at least one selected signal frequency of the measured pressure oscillations in relation to the crankshaft phase angle signal are acquired using discrete Fourier transformation.

In some embodiments, the method is furthermore distinguished by the following further steps:

lines of an equal phase position and of equal amplitude of the respectively same signal frequency, which lines are dependent on the inlet valve stroke phase difference and the outlet valve stroke phase difference, are acquired on the basis of the acquired phase position and amplitude of the respective selected signal frequency. This is carried out using reference lines of the equal phase position and of the equal amplitude of the respective signal frequency, which reference lines are stored in reference line characteristic diagrams or acquired by means of a respective algebraic model function;

A respectively common intersection point of the acquired lines of equal phase positions and of the acquired line of equal amplitude of the respective signal frequency is acquired by projection into a common plane spanned by the inlet valve stroke phase difference and the outlet valve stroke phase difference;

The inlet valve stroke phase difference and the outlet valve stroke phase difference are determined from the acquired common intersection point of the line of equal phase positions and of the line of equal amplitude of the respective signal frequency. A person skilled in the art will understand all components that serve for the supply of air to the respective combustion chambers of the cylinders, and which thus define the so-called air path, maybe be referred to as the "air intake tract" or also simply "intake tract", "intake system", or "inlet tract" of an internal combustion engine. These terms may include, for example, an air filter, an intake pipe, an intake manifold or distributor pipe or, for short, suction pipe, a throttle flap valve, as well as, if appropriate, a compressor and the intake opening in the cylinder and/or the inlet duct of the cylinder.

For the analysis of the pressure oscillation signal, the latter is subjected to a discrete Fourier transformation (DFT). For this purpose, an algorithm known as a fast Fourier transformation (FFT) may be used for the efficient calculation of the DFT. By means of DFT, the pressure oscillation signal is now broken down into individual signal frequencies which can thereafter be separately analyzed in simplified fashion with regard to their amplitude and the phase position.

In some embodiments, both the phase position and the amplitude of selected signal frequencies of the pressure oscillation signal are dependent on the valve control timings, that is to say on the phase profiles of the inlet valve stroke and of the outlet valve stroke of the internal combustion engine. The phase position of a signal frequency characterizes here the relative position of the signal frequency signal in relation to the crankshaft rotational angle signal, and the amplitude is a measure of the amount of deflection of the signal frequency signal in relation to a center line.

In some embodiments, it is irrelevant whether the same signal frequency or different signal frequencies are used to acquire the respective line of an equal phase position and to acquire the respective line of equal amplitude. Accordingly, in each case a line of an equal phase position and a line of equal amplitude of the same signal frequency or of different signal frequencies, that is to say, for example, the line of an equal phase position of a first signal frequency and the line of equal amplitude of a further signal frequency can be used to acquire a respective intersection point. In some embodiments, without additional sensors, the phase positions and amplitudes, and thus the present stroke positions of the inlet valves and of the outlet valves of the internal combustion engine, in relation to the crankshaft phase angle can be acquired with high accuracy and can thus be used for the accurate calculation of the charge exchange process and for the adjustment of the control parameters of the internal combustion engine.

In some embodiments, the phase positions and the amplitudes of a plurality of selected signal frequencies are acquired, and the respective lines of an equal phase position and of equal amplitude of these selected signal frequencies are acquired on the basis of the acquired phase positions and amplitudes of the respective selected signal frequencies. It is then possible to acquire a plurality of common intersection points of in each case an acquired line of an equal phase position and of an acquired line of equal amplitude of the selected signal frequencies. The inlet valve stroke phase difference and the outlet valve stroke phase difference are then acquired from the plurality of intersection points by forming mean values.

In some embodiments, it is also irrelevant whether in each case a line of an equal phase position and a line of equal amplitude of the same signal frequency or of different signal frequencies, that is to say, for example, the line of an equal phase position of a first signal frequency and the line of equal amplitude of a further signal frequency are used to acquire a respective intersection point. This increases the accuracy of the method further and therefore the accuracy of the acquired inlet valve stroke phase difference and of the acquired outlet valve stroke phase difference.

In some embodiments, this comprises the steps, which precede the above-described method of measuring a reference internal combustion engine in order to determine reference lines of equal phase positions and of equal amplitudes of selected signal frequencies of the pressure oscillation signal in the air intake tract as a function of the reference inlet valve stroke phase difference and the reference outlet valve stroke phase difference, and storing the reference lines of equal phase positions and of equal amplitudes of the selected signal frequencies of the pressure oscillation signal as a function of the reference inlet valve stroke phase difference and the reference outlet valve stroke phase difference in reference line characteristic diagrams. In this way, the acquisition of the inlet valve stroke phase difference and of the outlet valve stroke phase difference can be carried out in a simple manner.

The above-mentioned reference line characteristic diagrams may be stored in a memory area of an already existing engine control unit of the respective series-production internal combustion engine, and thus immediately be available for use in the above-mentioned method during the operation of the series-production internal combustion engine, without the need for separate memory means.

In some embodiments, algebraic model functions which represent the profile of the respective reference lines of equal phase positions and the profile of the respective reference lines of equal amplitudes of the selected signal frequencies of the pressure oscillation signal can be derived from the reference line characteristic diagrams, acquired as described above, of the selected signal frequencies of the pressure oscillation signal for the respective signal frequency as a function of the reference inlet valve stroke phase difference and the reference outlet valve stroke phase difference. In this way, respective mathematical formulations of the reference lines of equal phase positions and of the reference lines of equal amplitudes are made available, which can be used during the further method for the analytical acquisition of the common intersection point of the lines of equal phase positions and of the lines of equal amplitudes and thus of the identification of the inlet valve stroke phase difference and of the outlet valve stroke phase difference.

In some embodiments, the algebraic model functions, acquired as described above, for the selected signal frequencies may be stored in a memory area of an engine control unit of the respective series-production internal combustion engine. In this way, the model functions are immediately available in the controller and can be easily used for the respectively current acquisition of the lines of an equal phase position. It is thus not necessary to store corresponding reference line characteristic diagrams in the memory, which comprise large quantities of data and thus give rise to an increased memory space requirement.

In some embodiments, the lines of equal amplitudes and of equal phase positions are projected into a common plane spanned by the inlet valve stroke phase difference and the outlet valve stroke phase difference, and the common intersection point of these lines is acquired on the basis of algebraic functions. The method which is presented figuratively above for the sake of better illustration is therefore converted into algebraic functions, that is to say into mathematical formulations, in these embodiments. In this way, the method can be carried out particularly easily on an electronic computer unit, for example on a programmable engine control unit using corresponding program algorithms.

In some embodiments, the method may be executed on an electronic, programmable engine control unit of the respective series-production internal combustion engine. In some embodiments, no separate control or processing unit is necessary, and the algorithms of the method can be incorporated into the corresponding sequences of the engine control programs.

In some embodiments, adaptation of control variables or control routines, for example the fuel mass to be injected, the start time of the injection, the ignition time, the actuation of the phase adjusters of the camshafts, etc., in the context of a correction of or adaptation to the acquired inlet valve stroke phase difference and the acquired outlet valve stroke phase difference is carried out in the engine controller. It is thus possible for the combustion process to be optimized for the real conditions of the respective series-production internal combustion engine, and thus for the fuel demand and the emission values to be reduced.

For the execution of the methods, the selected signal frequencies may correspond to the intake frequency as a fundamental frequency or the 1st harmonic of the intake frequency and further multiples, that is to say the 2nd to nth of the so-called "harmonic" of said intake frequency of the internal combustion engine. Here, the intake frequency in turn uniquely relates to the rotational speed of the internal combustion engine. Then, for said selected signal frequencies, taking into consideration the crankshaft phase angle signal detected in parallel, the phase position, referred to in this context as phase angle, of the selected signal frequencies is acquired in relation to the crankshaft phase angle. This yields particularly clear results, which are thus easy to evaluate when the lines of equal phase positions and the lines of equal amplitudes are acquired, and this thus results in high accuracy of the results.

In some embodiments, the dynamic pressure oscillations in the air intake tract may be measured using a series-production-type pressure sensor, which is already provided in any case. This has the advantage that no additional sensor has to be provided, and therefore no additional costs are incurred for executing the methods herein. The crankshaft phase angle signal required for the execution of the method can be acquired by means of a toothed gear connected to the crankshaft and by means of a Hall sensor. Such a sensor arrangement is likewise already provided in modern internal combustion engines for other purposes. The crankshaft phase angle signal generated by means of said sensor arrangement can be easily jointly utilized by the method according to the invention. This has the advantage that no additional sensor has to be provided, and therefore no additional costs are incurred for executing the methods described.

When the inlet valve stroke phase difference $\Delta$EVH and the outlet valve stroke phase difference $\Delta$AVH on an "ideal" reference internal combustion engine are varied, and when the pressure oscillation signal in the air intake tract, referred to below for short as pressure oscillation signal, is analyzed by means of discrete Fourier analysis and taking into consideration individual selected signal frequencies which corresponded in each case to the intake frequency or to a multiple of the intake frequency, it has been found that both the phase positions and the amplitudes of the individual selected signal frequencies, that is to say the relative position of the pressure oscillation signal in relation to the crankshaft phase angle signal and the magnitude of the signal stroke, are dependent on the inlet valve stroke phase difference $\Delta$EVH and on the outlet valve stroke phase difference $\Delta$AVH.

Figure 3:
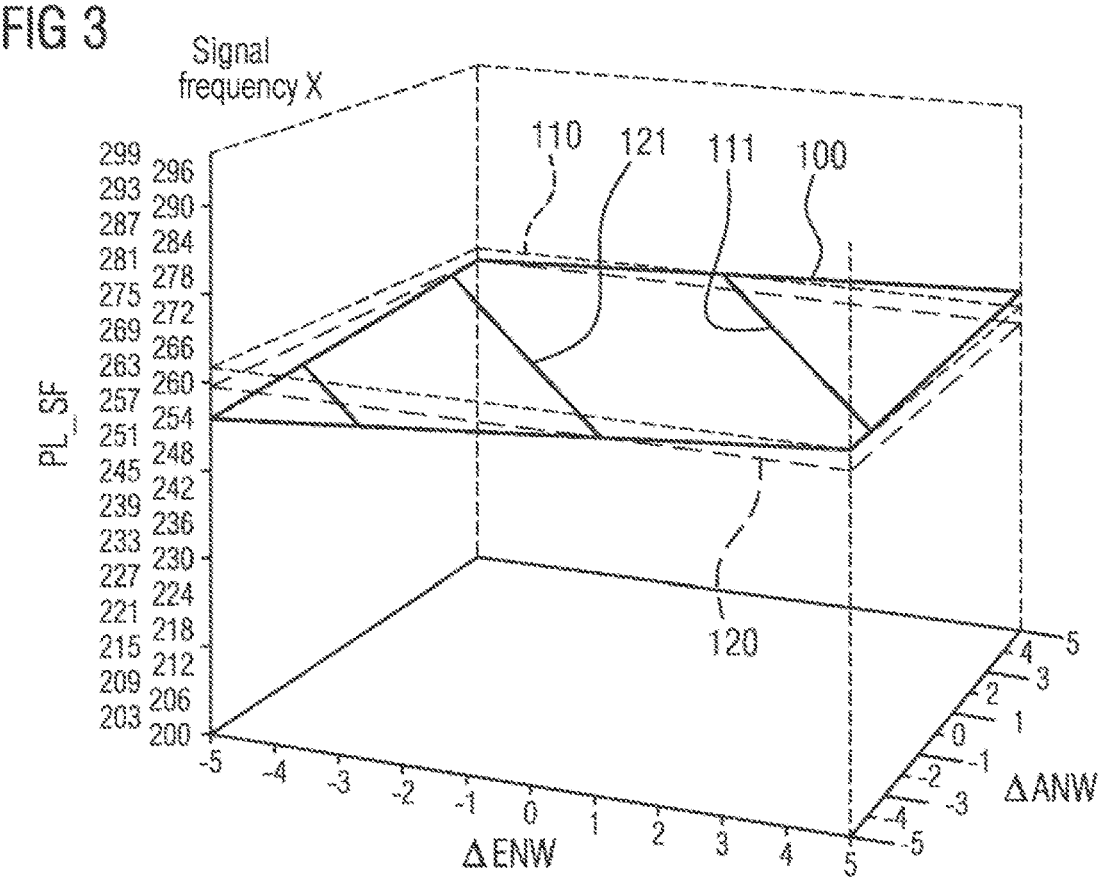
FIG. 3: shows two three-dimensional diagrams illustrating the dependency of the phase position (PL_SF) and the amplitude (Amp_SF) of a respective selected signal frequency of the pressure oscillation signal measured in the air intake tract on the inlet camshaft angle difference and the outlet camshaft angle difference.
Figure 3:
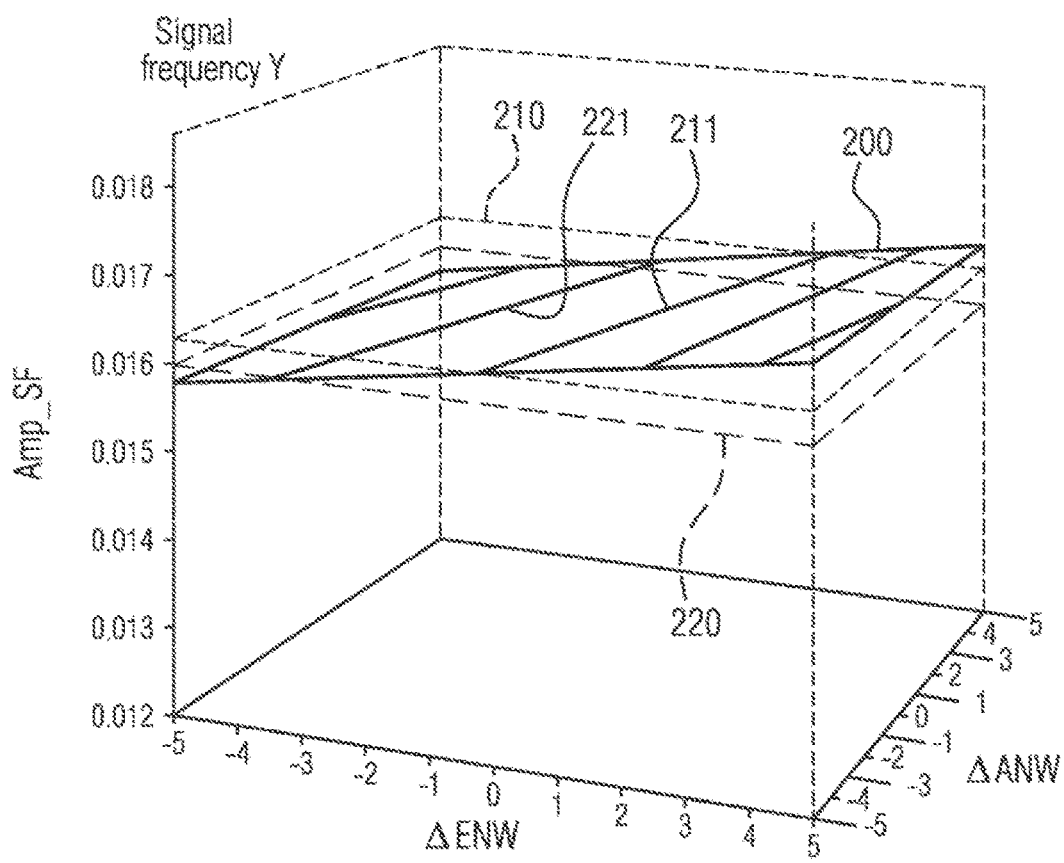

FIG. 3 illustrates this dependence respectively for the phase positions PL_SF (top diagram) and the amplitudes Amp_SF (bottom diagram) for a respective signal frequency X and signal frequency Y. In order to vary the inlet valve stroke phase difference $\Delta$EVH and the outlet valve stroke phase difference $\Delta$AVH, the inlet camshaft angle difference $\Delta$ENW and the outlet camshaft angle difference $\Delta$ANW were for this purpose varied in the range between −5° and +5° by means of a respective phase adjuster, and the respectively associated phase position PL_SF of the respective signal frequency and/or the respectively associated amplitude Amp_SF of the pressure oscillation signal was/were plotted vertically above the $\Delta$ENW-$\Delta$ANW plane which was spanned in this way.

Therefore, for the selected signal frequency X there is a resulting inclined phase surface 100 and respectively an inclined amplitude surface 200 in the spanned three-dimensional space. If section planes 110, 120, 210, 220 lying parallel to the $\Delta$ENW-$\Delta$ANW plane are now placed at the level of different phase positions PL_SF and/or amplitudes Amp-SF of the respective signal frequency X, Y, respectively lines of intersection with the respective phase surface 100 and/or amplitude surface 200 are therefore obtained, which lines are referred to as lines of equal phase positions 111, 121 or as lines of equal amplitudes 211, 221. That is to say the same phase position is obtained for all the $\Delta$ENW-$\Delta$ANW combinations located along such a line of equal phase positions, and the same amplitude of the respectively selected signal frequencies X, Y of the pressure oscillation signal is obtained for all the $\Delta$ENW-$\Delta$ANW combinations located along such a line of equal amplitudes. Conversely, this means that an acquired phase position and an acquired amplitude of a respective signal frequency of the pressure oscillation signal cannot be assigned a unique $\Delta$ENW-$\Delta$ANW combination.

In the top diagram of FIG. 3, for the signal frequency X, the phase surface 100 and, by way of example, two section planes 110, 120 are indicated at phase position 263° and 260°. The line of an equal phase position 111 is obtained for phase position 263°, and the line of an equal phase position 121 is obtained for phase position 260°. In the bottom diagram of FIG. 3, for the signal frequency Y, the amplitude surface 200 and, by way of example, two section planes 210, 220 are indicated at amplitude 0.0163 and 0.0160. The line of equal amplitudes 221 is obtained for amplitude 0.0160, and the line of equal amplitude 211 is obtained for amplitude 0.0163.

For the purpose of further examination of the relationships, the lines of an equal phase position and also the lines of equal amplitudes of the respectively selected signal frequency of the pressure oscillation signal have now been projected into the $\Delta$ENW-$\Delta$ANW plane. This is illustrated separately in FIG. 4, in a way analogous to FIG. 3, for the phase position PL_SF (top diagram) and the amplitude PL_SF (bottom diagram). The corresponding lines of equal phase positions 111, 121 for the signal frequency X at 263° and 260° and also the line of equal amplitudes 211, 221 for the signal frequency Y at 0.0163 and 0.0160 are also denoted by corresponding reference signs in this illustration. It is shown that the lines of equal phase positions and the lines of equal amplitudes of the respectively selected signal frequencies have gradients in opposite directions.

Figure 5:
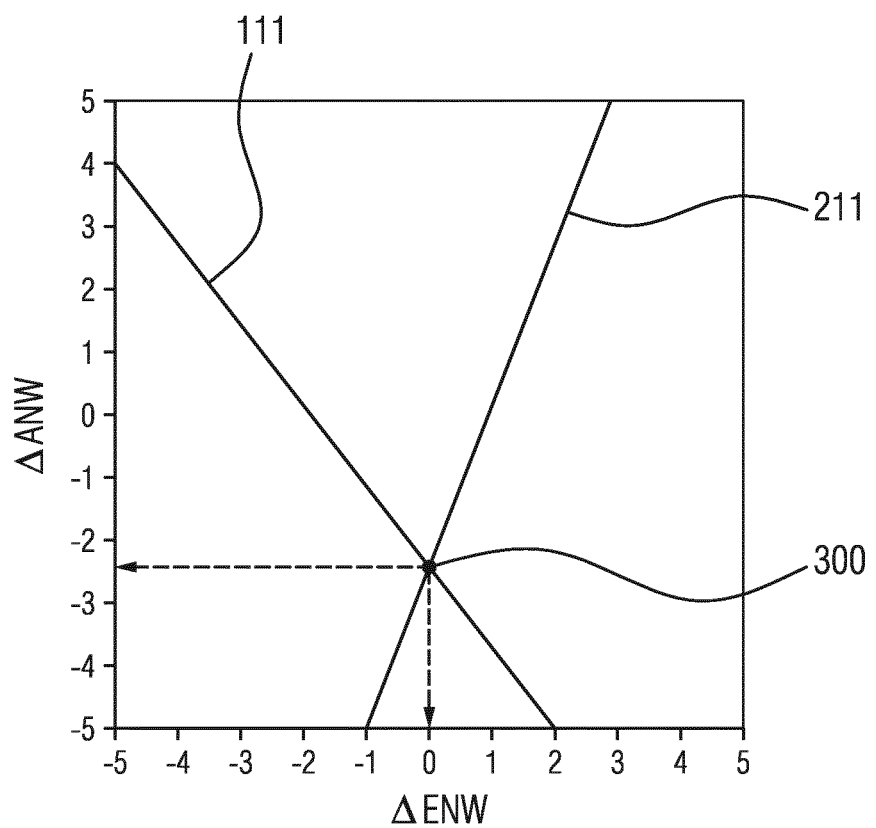
FIG. 5: shows a two-dimensional diagram as per FIG. 4 with an indicated line of equal phase positions and an indicated line of equal amplitudes of a respective signal frequency with an intersection point for a determined combination of inlet camshaft angle difference and the outlet camshaft angle difference.

If the lines of equal phase positions and the lines of equal amplitudes are now projected one on top of the other in the $\Delta$ENW-$\Delta$ANW plane, as is illustrated in FIG. 5 on the basis of the line of an equal phase position 111 and the line of equal amplitudes 211, it becomes apparent that the line of an equal phase position and the line of equal amplitude 211 intersect at a common intersection point 300, which therefore represents a single $\Delta$ENW-$\Delta$ANW combination, illustrated by the indicated dashed arrow lines. Since, taking an ideal reference engine as a basis, it is possible to assume direct and uninfluenced interaction of the inlet camshaft 23 with the inlet valves 22 and of the outlet camshaft 33 with the outlet valves 32, an inlet camshaft angle difference $\Delta$ENW can be assigned a specific inlet valve stroke phase difference $\Delta$EVH, and the outlet camshaft angle difference $\Delta$ANW can be assigned a specific outlet valve stroke phase difference $\Delta$AVH.

Thus, if otherwise ideal relationships are assumed, it is therefore possible, by acquiring the phase position and the amplitude of a respectively selected signal frequency of the pressure oscillation signal, and taking into consideration and superposing the known assignable lines of an equal phase position and equal amplitude of the respective signal frequency to acquire a single intersection point of the line of equal phase positions and the line of equal amplitudes, and to determine the value of the inlet valve stroke phase difference $\Delta$EVH and of the outlet valve stroke phase difference $\Delta$AVH therefrom.

Figure 4:
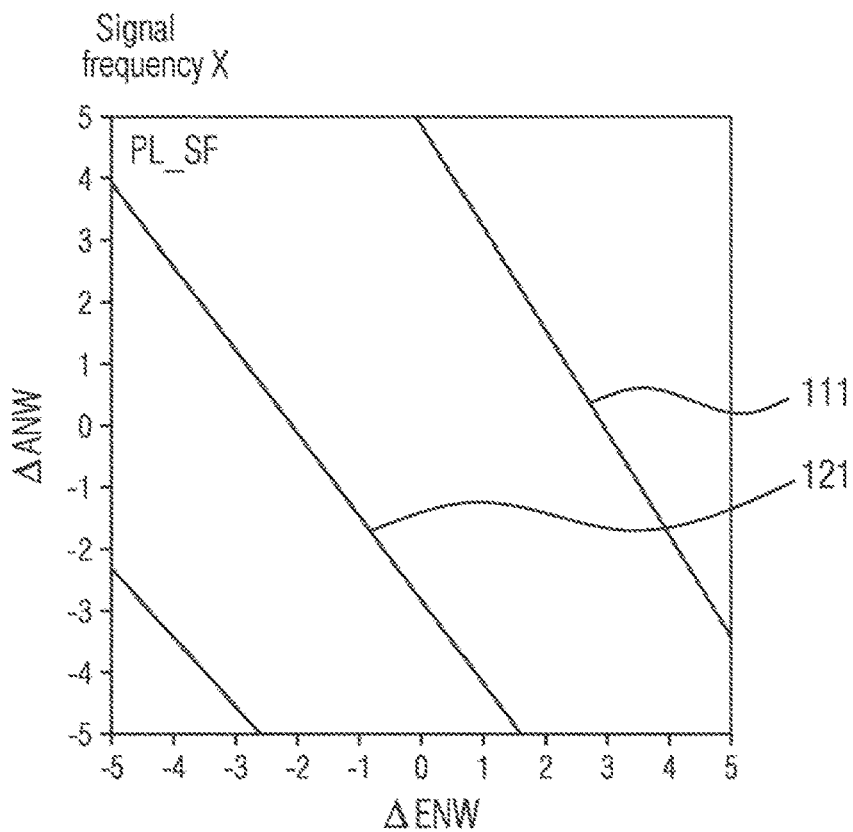
FIG. 4: shows two two-dimensional diagrams illustrating lines of equal phase positions and lines of equal amplitudes for a respectively selected signal frequency of the pressure oscillation signal measured in the air intake tract, projected into a plane spanned by the inlet camshaft angle difference and the outlet camshaft angle difference.
Figure 4:
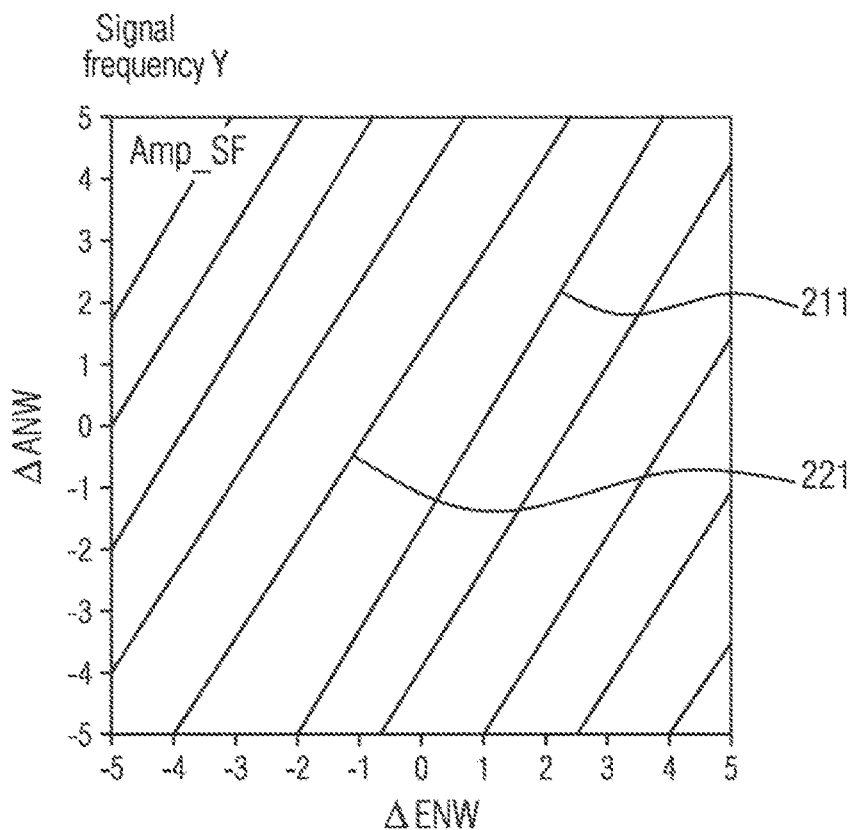
Figure 6:
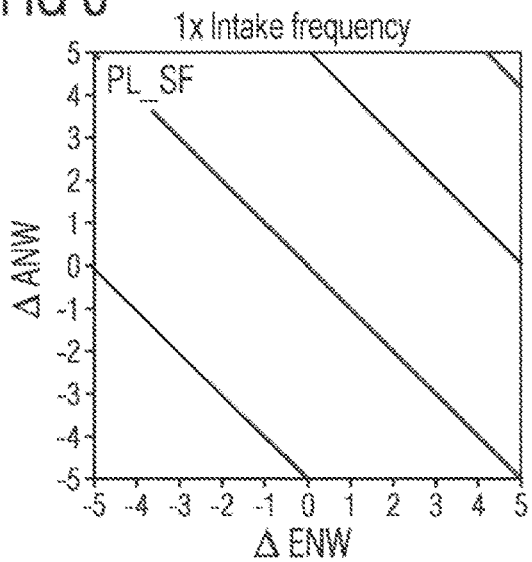
FIG. 6: shows two-dimensional diagrams for lines of an equal phase position and lines of equal amplitude as in FIG. 4 for in each case three different signal frequencies.
Figure 6:
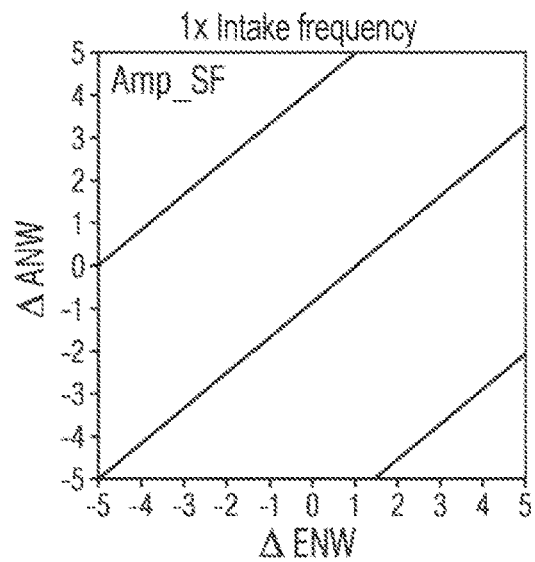
Figure 6:
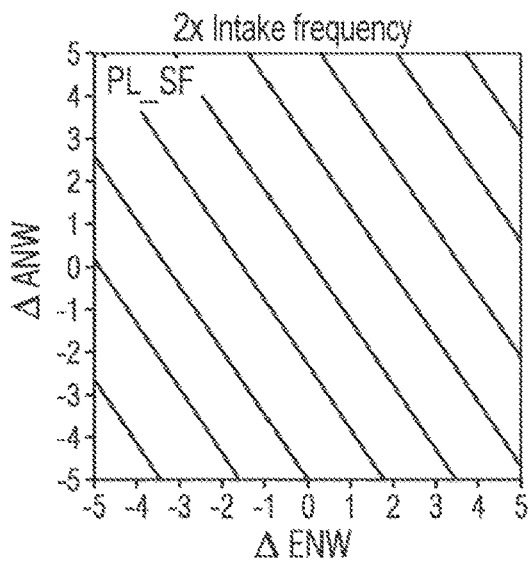
Figure 6:
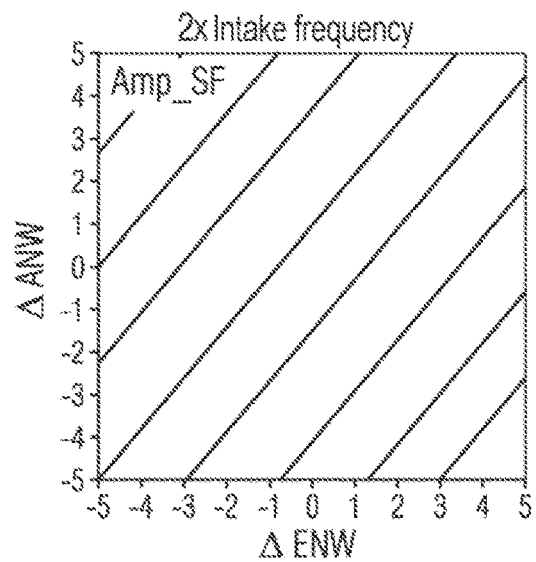
Figure 6:
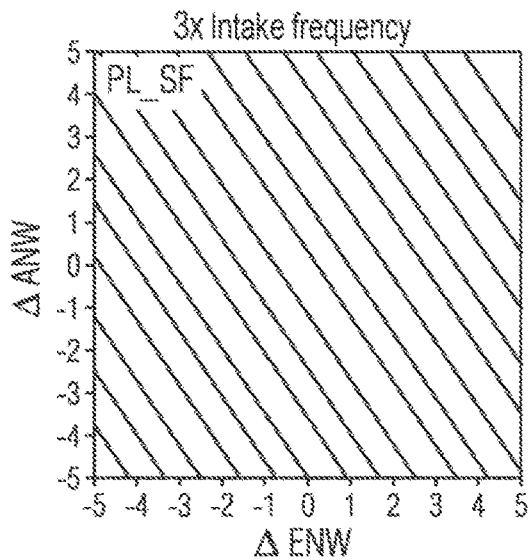
Figure 6:
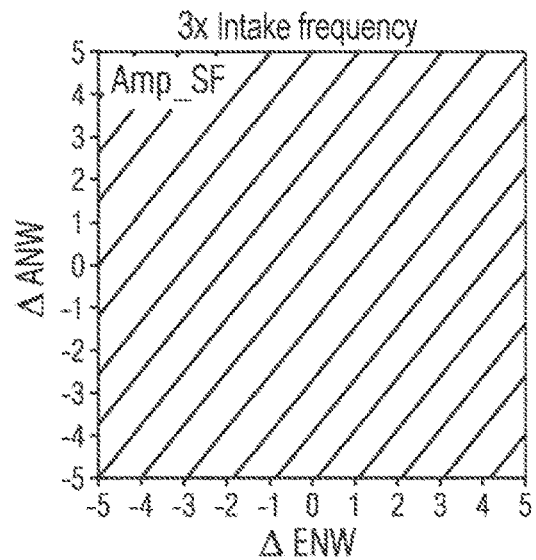

In FIG. 6, for the sake of further clarification of the relationships, three diagrams with lines of an equal phase position, projected into the $\Delta$ENW-$\Delta$ANW plane, are now illustrated on the left-hand side, in a way analogous to the top diagram in FIG. 4, and three diagrams with lines of equal amplitude, projected into the $\Delta$ENW-$\Delta$ANW plane are illustrated on the right-hand side, in a way analogous to the bottom diagram in FIG. 4, in each case for three different signal frequencies. These comprise the intake frequency itself (1st Harmonic), top diagrams, twice the intake frequency (2nd Harmonic), middle diagrams and the third intake frequency (3rd Harmonic), bottom diagrams.

It can be clearly apparent that as the signal frequency rises, the negative gradient or the positive gradient increases and the distance between the lines decreases both in the case of the lines of an equal phase position and in the case of the lines of equal amplitude. It has now become apparent that in the case of the combination of a line of an equal phase position with a line of equal amplitude, it is irrelevant to the result which can be found at the intersection point of the two lines, whether lines of the same signal frequency or lines of different signal frequencies are respectively made to meet at the intersection point. Nevertheless, it appears appropriate for lines of an equal phase position and lines of equal amplitude of the same signal frequency to be respectively combined.

In principle the same intersection point is respectively obtained when acquiring the intersection points of pairings of lines of an equal phase position and lines of equal amplitude for a plurality of respectively corresponding signal frequencies or by varying the pairings of lines of an equal phase position and lines of equal amplitude for a plurality of respectively different signal frequencies. However, a small degree of variation of the intersection points occurs during the measurements as result of deviations and tolerances. By forming mean values, it is then possible to acquire an intersection point and therefore in each case a value for the inlet camshaft angle difference $\Delta$ENW and/or the inlet valve stroke phase difference $\Delta$EVH and the outlet camshaft angle difference $\Delta$ANW and/or the outlet valve stroke phase difference $\Delta$AVH from the plurality of intersection points.

The relationships graphically illustrated in FIGS. 3 to 6 serve for ease of understanding of the principles of the method. Said relationships may self-evidently also be represented on the basis of corresponding algebraic formulations, and the method may be executed on this basis. For this purpose, in order, for example, to represent the lines of equal phase positions, algebraic model functions are derived on the basis of mathematical-physical laws, which functions can be used to acquire the common intersection point and the necessary phase shift.

Various embodiments of the teachings herein include methods for the combined identification of an inlet valve stroke phase difference $\Delta$EVH and of an outlet valve stroke phase difference $\Delta$AVH of an internal combustion engine during operation is based on the realizations presented above. During operation of the internal combustion engine, the dynamic pressure oscillations in the air intake tract are continuously measured. This may be carried out at specific selected operating points of the internal combustion engine. The respective measurement results in a pressure oscillation signal. Said pressure oscillation signal is supplied to a control unit of the internal combustion engine. In the control unit, the pressure oscillation signal is subjected, by means of program algorithms stored therein, to a discrete Fourier transformation, and the phase position and the amplitude of at least one selected signal frequency, preferably of the first and/or further harmonics of the intake frequency of the internal combustion engine, of the measured pressure oscillations of the intake air in the air intake tract, in relation to the crankshaft phase angle signal are acquired. Subsequently, for the respective selected signal frequency, in each case a corresponding line of an equal phase position and a line of equal amplitude are now acquired on the basis of the acquired respective phase position and the amplitude. This is carried out in each case either by selection of a reference line of the equal phase position or amplitude from reference line characteristic diagrams which are typical of the corresponding internal combustion engine series and which are stored in a memory area of the control unit, or by calculation by means of respective algebraic model functions which are typical of the corresponding internal combustion engine series and which are stored in a memory area of the control unit.

By means of corresponding program algorithms which are stored in the control unit, the lines of an equal phase position and lines of equal amplitude which are acquired in this way of the respectively selected signal frequency are then projected into a common plane spanned from the inlet valve stroke phase difference $\Delta$EVH and the outlet valve stroke phase difference $\Delta$AVH, and made to meet at a respective common intersection point. It is then possible to determine the inlet valve stroke phase difference $\Delta$EVH and outlet valve stroke phase difference $\Delta$AVH from the position of said common intersection point in the plane spanned from the inlet valve stroke phase difference $\Delta$EVH and the outlet valve stroke phase difference $\Delta$AVH. In some embodiments, a plurality of intersection points, acquired as described above, can then be used for the acquisition of the inlet valve stroke phase difference and the outlet valve stroke phase difference, and the mean value can be formed in order to thus obtain a clear result which is further improved in its accuracy.

In some embodiments, specific characteristic diagrams with reference lines of an equal phase position and specific characteristic diagrams with reference lines of equal amplitude or corresponding algebraic model functions are used. These are dependent on the type of design and the detailed structural design of the type series/series of an internal combustion engine and may therefore be acquired in advance on a structurally identical reference internal combustion engine that is typical of the series. In some embodiments, on the reference internal combustion engine, the pressure oscillation signal of the intake air in the air intake tract is recorded at the greatest possible number of operating points, in particular at specific selected operating points, with variation of the inlet valve stroke phase difference $\Delta$EVH and of the outlet valve stroke phase difference $\Delta$AVH, is subjected to a discrete Fourier transformation, and the phase positions and also the amplitudes for the selected signal frequencies are stored as a function of the inlet valve stroke phase difference $\Delta$EVH and of the outlet valve stroke phase difference $\Delta$AVH. It must be ensured here that no piston stroke phase difference $\Delta$KH is superposed on and falsifies the results.

On the basis of these three-dimensional data diagrams which are acquired in this way, it is then possible to acquire the lines of an equal phase position and the lines of equal amplitude for the individual selected signal frequencies and to store them in corresponding characteristic diagrams, or to acquire the algebraic model functions for the calculation of the lines of an equal phase position and the lines of equal amplitude. The characteristic diagrams and/or model functions which are acquired in this way are then stored in a memory area of a control unit of every structurally identical series-production internal combustion engine and can be used for executing the method according to the invention.

Figure 7:
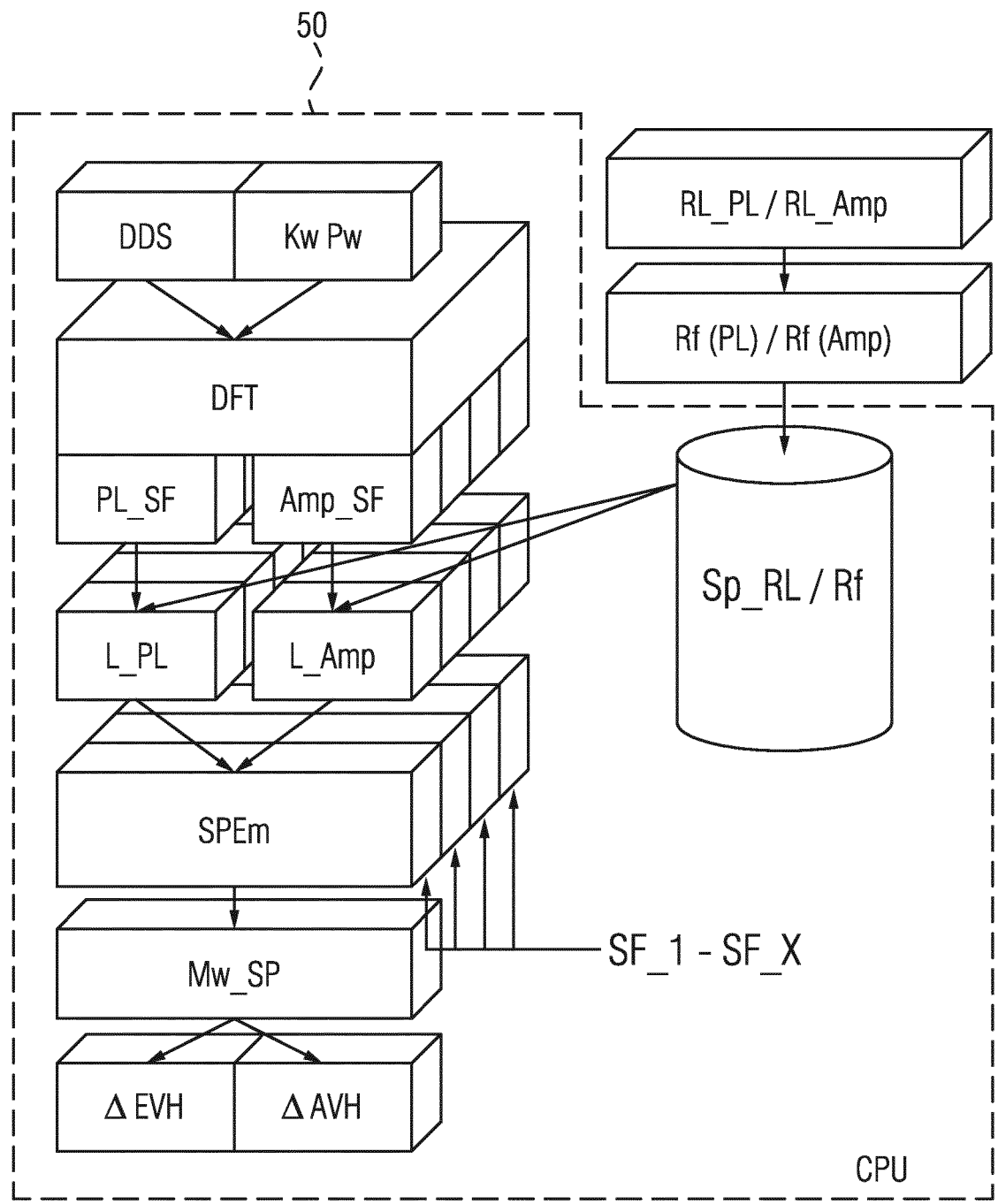
FIG. 7: shows a simplified block diagram illustrating an example method incorporating teachings of the present disclosure.

FIG. 7 illustrates an embodiment of a method incorporating the teachings herein for the combined identification of an inlet valve stroke phase difference and of an outlet valve stroke phase difference of a cylinder of a series-production internal combustion engine during operation, once again in the form of a simplified block diagram showing the significant steps. At the start, dynamic pressure oscillations, assignable to the respective cylinder, of the intake air in the air intake tract of the respective series-production internal combustion engine are measured during operation and a corresponding pressure oscillation signal is generated therefrom, and a crankshaft phase angle signal is acquired at the same time, as illustrated by the blocks which are arranged in parallel and which are denoted as DDS (dynamic pressure oscillation signal) and KwPw (crankshaft phase angle signal).

Then, from the pressure oscillation signal DDS, the phase position and the amplitude of at least one respectively selected signal frequency of the measured pressure oscillations in relation to the crankshaft phase angle signal KwPw are acquired using discrete Fourier transformation DFT, which is illustrated by the blocks which are denoted as DFT (discrete Fourier transformation), PL_SF (phase position of the respective signal frequency) and Amp_SF (amplitude of the respective signal frequency). In this context, in each case a plurality of values can be acquired for a corresponding number of different signal frequencies SF_1 to SF_X. Then, on the basis of the acquired phase position PL_SF and amplitude Amp_SF of a respective selected signal frequency SF_1 . . . , SF_X, in each case a line of an equal phase position L_PL and of equal amplitude L_Amp of the respectively same signal frequency SF_1 . . . , SF_X, which line is dependent on the inlet valve stroke phase difference and outlet valve stroke phase difference is acquired as is illustrated by means of the correspondingly denoted blocks. This is carried out using reference lines of the equal phase position RL-PL and of the equal amplitude RL_Amp of the respective signal frequency SF_1 . . . , SF_X, which reference lines are stored in reference line characteristic diagrams or acquired by means of a respective algebraic model function. For this purpose, a memory area, denoted as Sp_RL/Rf, of an engine control unit 50 is illustrated in the diagram in FIG. 7, from which memory area the reference lines of an equal phase position RL_PL and reference lines of equal amplitude RL_Amp or else corresponding algebraic model functions Rf(PL) and respectively Rf(Amp) which are made available therein can be retrieved for the purpose of acquiring these lines.

Subsequently, at least one respective common intersection point of an acquired line of an equal phase position L_PL and an acquired line of equal amplitude L_Amp of the respective signal frequency SF_1 . . . , SF_X is then acquired by projection into a common plane spanned by the inlet valve stroke phase difference and the outlet valve stroke phase difference, which is illustrated by the block which is denoted as SPEm (acquisition of intersection point). As is apparent from the illustration, a plurality of intersection points are acquired here from a plurality of pairings of lines of an equal phase position L_PL and lines of equal amplitude L_Amp, and a mean value, which is illustrated by the block which is denoted as Mw_SP (mean value of the intersection points), is obtained therefrom. This serves to increase the accuracy of the method.

Finally, the inlet valve stroke phase difference $\Delta$EVH and the outlet valve stroke phase difference $\Delta$AVH are determined from the acquired mean value of the intersection points Mw_SP of the line of an equal phase position L_PL and the line of equal amplitude L_Amp of the respective signal frequency, which is illustrated by the correspondingly denoted blocks.

Furthermore, FIG. 7 shows the steps, which precede the above-described method, of measuring a reference internal combustion engine in order to determine reference lines of equal phase positions RL_PL and of equal amplitudes RL_Amp of selected signal frequencies of the pressure oscillation signal in the air intake tract as a function of the reference inlet valve stroke phase difference and the reference outlet valve stroke phase difference, and storing the reference lines of equal phase positions and of equal amplitudes of the selected signal frequencies of the pressure oscillation signal in each case as a function of the reference inlet valve stroke phase difference and the reference outlet valve stroke phase difference in reference line characteristic diagrams, as is symbolically illustrated by the block denoted by RL_PL/RL_Amp.

The block denoted as Rf(PL)/Rf(Amp) contains the derivation of algebraic model functions which represent, as reference line functions of an equal phase position Rf(PL), the profile of the respective reference lines of equal phase positions, and represent, as reference line functions of equal amplitude RF(Amp), the profile of the respective reference lines of equal amplitudes of the selected signal frequencies of the pressure oscillation signal as a function of the reference inlet valve stroke phase difference and the reference outlet valve stroke phase difference, on the basis of the previously acquired reference line characteristic diagrams.

The reference line characteristic diagrams or reference line functions of an equal phase position and reference line functions of equal amplitude are then stored in a memory area Sp_RL/Rf of an engine control unit 50 CPU of the respective series-production internal combustion engine, where they are available for the execution of the method according to the invention as discussed above. The border shown by dashed lines around the corresponding blocks in the block diagram symbolically represents the boundary between an electronic, programmable engine control unit 50 (CPU) of the respective series-production internal combustion engine, on which the method may be executed.

The invention claimed is:

1. A method for analyzing a cylinder of a series-production internal combustion engine during operation, the method comprising:
    measuring dynamic pressure oscillations, associated with the cylinder, of intake air in an air intake tract of the series-production internal combustion engine during operation;
    generating a pressure oscillation signal based on the measured dynamic pressure oscillations;
    determining a crankshaft phase angle signal corresponding in time to the measured dynamic pressure oscillations;
    determining a phase position and an amplitude corresponding to a selected signal frequency of the measured dynamic pressure oscillations based on the crankshaft phase angle signal and the pressure oscillation signal, using a discrete Fourier transformation;
    determining, using stored reference line data or stored algebraic functions, a constant-phase-position line having a constant phase position corresponding to the determined phase position and a constant-amplitude line having a constant amplitude corresponding to the determined amplitude;
    projecting the constant-phase-position line and constant-amplitude line onto a common plane and determining an intersection point of the projected constant-phase-position line and the projected constant-amplitude line;
    determining an inlet valve stroke phase difference and an outlet valve stroke phase difference of the cylinder based on the determined intersection point; and
    adjusting at least one control parameter of the series-production internal combustion engine based on the determined inlet valve stroke phase difference and outlet valve stroke phase difference.

2. The method as claimed in claim 1, further comprising:
    determining respective phase positions and amplitudes corresponding to each of a plurality of signal frequencies of the measured dynamic pressure oscillations;
    determining a respective constant-phase-position line and a respective constant-amplitude line corresponding to each of the plurality of signal frequencies based on the respective phase positions and amplitudes determined for each of the plurality of signal frequencies;
    determining a plurality of intersection points by determining, for each of the plurality of signal frequencies, an intersection point of the respective constant-phase-position line and the respective constant-amplitude line; and
    wherein the determining of the inlet valve stroke phase difference and the outlet valve stroke phase difference is based on a mean value of the plurality of intersection points.

3. The method as claimed in claim 2, wherein the plurality of signal frequencies include a first signal frequency and multiples of the first signal frequency.

4. The method as claimed in claim 1, further comprising:
    measuring dynamic pressure oscillations, associated with a reference cylinder, of intake air in a reference air intake tract of a reference internal combustion engine so as to determine respective reference constant-phase-position lines and respective reference constant-amplitude lines corresponding to each of a plurality of reference signal frequencies of a reference pressure oscillation signal in the reference air intake tract as a function of reference inlet valve stroke phase difference values and reference outlet valve stroke phase difference values, and
    storing the reference constant-phase-position lines and the reference constant-amplitude lines in reference line characteristic maps.

5. The method as claimed in claim 4, further comprising storing the reference line characteristic maps in a memory area of an engine control unit of the series-production internal combustion engine.

6. The method as claimed in claim 4, further comprising deriving algebraic functions, which represent a profile of the respective reference constant-phase-position lines and the respective reference constant-amplitude lines from the reference line characteristic maps as a function of the reference inlet valve stroke phase difference values and the reference outlet valve stroke phase difference values.

7. The method as claimed in claim 6, further comprising storing the derived algebraic functions in a memory area of an engine control unit of the series-production internal combustion engine.

8. The method as claimed in claim 1, wherein the projecting of the constant-phase-position line and the constant-amplitude line onto the common plane is performed based on the stored algebraic functions.

9. The method as claimed in claim 1, wherein the method is executed by an electronic, programmable engine control unit of the series-production internal combustion engine.

10. The method as claimed in claim 9, wherein the engine control unit executes a correction to the inlet valve stroke phase difference and the outlet valve stroke phase difference.

11. The method as claimed in claim 1, wherein the dynamic pressure oscillations in the air intake tract are measured using a series-production-type pressure sensor associated with the air intake tract.

\* \* \* \* \*